United States Patent [19]

Ikenoya et al.

[11] 4,437,304

[45] Mar. 20, 1984

[54] STRUCTURE FOR CONTROLLING OPERATIONS OF SECONDARY AIR SUPPLY MEANS AND THROTTLE OPENER IN INTERNAL COMBUSTION ENGINE FOR MOTORCYCLES

[75] Inventors: Yasuo Ikenoya, Kawagoe; Shuso Ueda, Asaka; Masafumi Araki, Kawagoe, all of Japan

[73] Assignee: Honda Giken Kogyo Kabushiki Kaisha, Tokyo, Japan

[21] Appl. No.: 421,334

[22] Filed: Sep. 22, 1982

[30] Foreign Application Priority Data

Dec. 24, 1981 [JP] Japan .................. 56-212713

[51] Int. Cl.³ .............................................. F01N 3/22
[52] U.S. Cl. ......................................... 60/290; 60/293
[58] Field of Search .................... 60/290, 293; 123/339

[56] References Cited

U.S. PATENT DOCUMENTS

| | | | |
|---|---|---|---|
| 3,962,868 | 6/1976 | Matumoto | 60/290 |
| 4,192,141 | 3/1980 | Nonoyama | 60/290 |
| 4,376,427 | 3/1983 | Mizuno | 60/290 |

Primary Examiner—Douglas Hart

Attorney, Agent, or Firm—Armstrong, Nikaido, Marmelstein & Kubovcik

[57] ABSTRACT

A motorcycle having an internal combustion engine mounted on a main frame and including suction and exhaust systems, an exhaust gas cleaning means adapted to supply secondary air to the exhaust system for cleaning an exhaust gas flowing therethrough, a carburetor provided in the suction system and provided with a throttle valve therein, and a throttle opener provided on the carburetor and adapted to open the throttle valve slightly while the internal combustion engine is decelerated. A secondary air supply passage is connected to the exhaust system, and a flow rate of the secondary air flowing through the passage is controlled by a secondary air control valve. When a vehicle speed of the motorcycle has decreased to a level not higher than a predetermined level, the secondary air control valve is closed to stop supplying the secondary air to the exhaust system, and the operation of the throttle opener is rendered ineffective simultaneously. This prevents the temperature of the exhaust gas from increasing. Accordingly, a change in the color, and the discoloring, of an outer surface of the exhaust system can be prevented. Also, a decrease in the effect of engine brake can be prevented effectively.

1 Claim, 2 Drawing Figures

4,437,304

STRUCTURE FOR CONTROLLING OPERATIONS OF SECONDARY AIR SUPPLY MEANS AND THROTTLE OPENER IN INTERNAL COMBUSTION ENGINE FOR MOTORCYCLES

BACKGROUND OF THE INVENTION

1. Field of the Invention

This invention relates to a structure for controlling operations of a means for supplying secondary air to an exhaust system, and a throttle opener provided on a carburetor in a suction system, for an internal combustion engine mounted on a motorcycle.

2. Description of the Prior Art

In an internal combustion engine mounted on a motorcycle, it is generally known that an exhaust gas-cleaning secondary air is supplied to an exhaust system for the engine to eliminate unburnt noxious components from an exhaust gas, and that, when the engine is rotated at a low speed, a throttle is opened slightly by a throttle opener provided on a carburetor in a suction system for the engine, to increase a suction rate of air and thereby promote the combustion of a gaseous mixture, whereby a discharge rate of unburnt components in the exhaust gas can be minimized. However, when an exhaust gas-cleaning secondary air is supplied sufficiently to the exhaust system at such time that the motorcycle runs at an extremely low speed, a comparatively large amount of unburnt components of an exhaust gas, which is discharged from the engine, and the secondary air supplied to the exhaust system react with each other actively in the exhaust system. Consequently, the exhaust system, especially, an exhaust pipe and a muffler therein are heated to a comparatively high temperature since the wind occurring as the motorcycle runs at such a low speed does not substantially serve to cool them. This often causes the color of films of chromium, which are formed on the outer surfaces of the exhaust pipe and muffler, to be changed or lost, so that the commercial values of these parts decrease. In addition, while the motorcycle runs at such a low speed that is not more than a predetermined level, the effect of engine brake decreases slightly due to an operation of the throttle opener.

SUMMARY OF THE INVENTION

Therefore, it is a primary object of the present invention to provide a simply-formed structure for controlling operations of a secondary air supplying means and a throttle opener, in which structure the characteristics of a flow rate of the air fed by the secondary air supply means and the characteristics of the throttle opener are selected suitably to render ineffective the operations of both the secondary air supplying means and throttle opener by means of a common switch when a vehicle speed of the motorcycle is not higher than a predetermined level, and thereby prevent the color of parts of an exhaust system from being changed or lost, and the effect of an engine brake from being weakened.

In order to achieve the above object, the present invention provides a structure for controlling operations of a secondary air supplying means and a throttle opener in an internal combustion engine for motorcycles wherein the internal combustion engine is mounted on a main frame and includes suction and exhaust systems, an exhaust gas cleaning means for supplying secondary air to the exhaust system so as to clean an exhaust gas flowing therethrough, a carburetor provided in the suction system and including a throttle valve, and a throttle opener provided on the carburetor and adapted to open the throttle valve slightly while the internal combustion engine is rotated at a low speed, comprising a secondary air supply passage communicated with the exhaust system, a control valve adapted to control a flow rate of the secondary air flowing through the secondary air supply passage, a first electromagnetic valve for opening and closing the secondary air control valve, a second electromagnetic valve for controlling an operation of the throttle opener, a power source circuit for connecting the first and second electromagnetic valves to a power source, and a switch used in common with the secondary air supply means and throttle opener, provided in the power source circuit, and adapted to detect such a vehicle speed of the motorcycle that is not higher than a predetermined level and thereby shift the operations of the first and second electromagnetic valves, whereby the secondary air control valve is closed with the operation of the throttle opener rendered ineffective at the same time.

The above and other objects, features and advantages of the invention will become apparent from the following detailed description of a preferred embodiment when taken in conjunction with the accompanying drawings.

DESCRIPTION OF THE PREFERRED EMBODIMENT

An embodiment of the present invention will be described with reference to the drawings.

Figure 1:
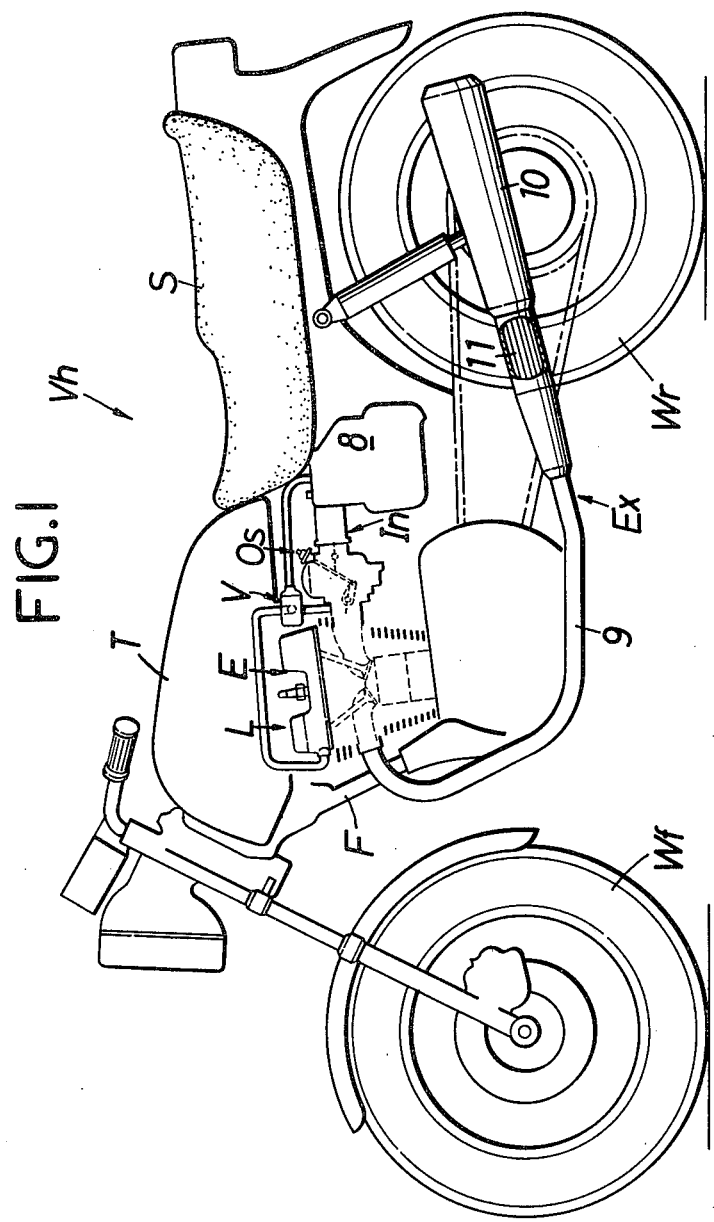
FIG. 1 is a side elevational view of a motorcycle provided with a structure according to the present invention.

Referring to FIG. 1, a fuel tank T and a seat S are supported on an upper portion of a main frame F of a motorcycle Vh, and front and rear wheels Wf, Wr are suspended from front and rear portions of the frame F. In a space surrounded by these parts, an internal combustion engine E for driving the rear wheel Wr is mounted on the main frame F in such a manner that the engine E extends laterally.

Figure 2:
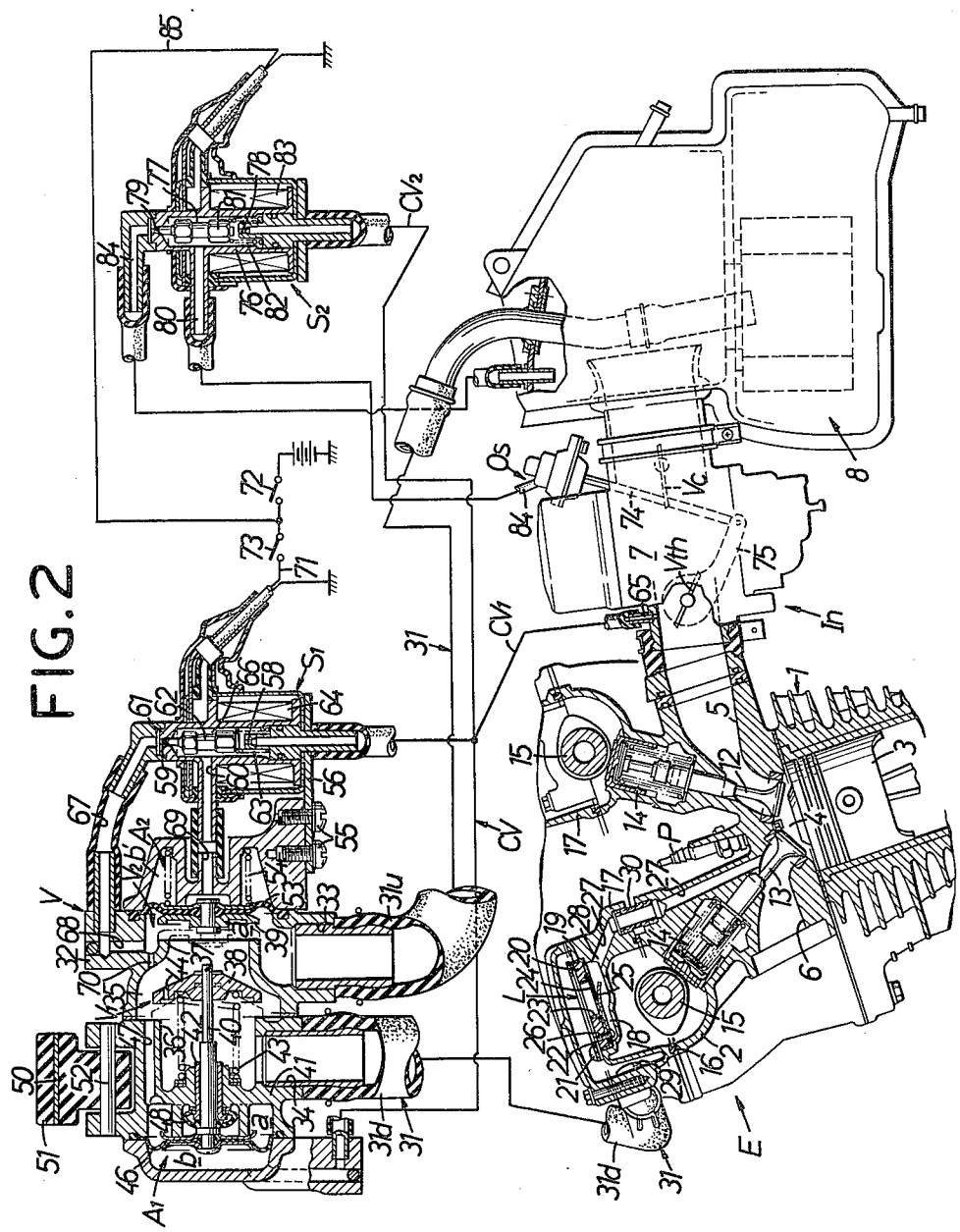
FIG. 2 is a system diagram of the structure as a whole according to the present invention.

Referring to FIG. 2, a cylinder head 2 in an engine body 1 is provided in a rear half portion thereof with a suction port 5 communicated with a combustion chamber 4 above a piston 3, and in a front half portion thereof with an exhaust port 6 communicated with the combustion chamber 4. The suction port 5 is opened at a rear side of the engine body 1, and the exhaust port 6 at a front side thereof. As shown in FIG. 1, a suction system In including a carburetor 7 and an air cleaner 8, which are disposed behind the engine body 1, is connected to the suction port 5, and an exhaust system Ex including an exhaust pipe 9 and a muffler 10 to the exhaust port 6. An exhaust gas-cleaning three-way conversion catalyst 11 (TWC) is provided in an intermediate portion of the muffler 10. The cylinder head 2 is provided therein, just as cylinder heads in general, with suction and exhaust valves 12, 13 adapted to open and close those open ends of the suction and exhaust ports 5, 6 which are on the side the combustion chamber 4. These valves 12, 13 are opened and closed in accordance with the cooperative actions of valve springs 14 and valve-actuating mechanisms 15. An ignition plug P is provided in the portion of the cylinder head 2 which is between the suction and exhaust valves 12, 13.

A head cover 17 enclosing via a packing 16 a space above the exhaust valve 13 in the cylinder head 2 is provided therein with a check valve, which is adapted to be operated in response to a pulsating pressure of an exhaust gas, i.e. a lead valve L.

A valve chamber 18 is formed in the head cover 17, and a lead valve body 20 is housed in the valve chamber 18 via a heat-resisting packing 19. The lead valve body 20 is fixed to the head cover 17 via a mounting plate 22 with screws 21. The lead valve body 20 is provided with a valve port 23 therein. The lead valve body 20 is further provided on its lower surface with a lead 24 for opening and closing the valve port 23, and a lead stopper 25 for restricting the degree of opening of the lead 24, and both of the lead 24 and lead stopper 25 are fixed to the lead valve body 20 with a setting screw 26.

A secondary air passage 27 is formed so as to extend through the walls of both the cylinder head 2 in the engine body 1 and head cover 17. The passage 27 is communicated at its upper end with a discharge port 28 of the lead valve L, and at its lower end with the portion of the exhaust port 6 which is in the vicinity of the exhaust valve 13.

The secondary air passage 27, which extends through the walls of both the cylinder head 2 and head cover 17, is joined air-tightly at an intermediate portion thereof with a connecting pipe 30 when the cylinder head 2 and head cover 17 are combined with each other. When the cylinder head 2 and head cover 17 are combined with each other, the connecting pipe 30 is used also as a guide member.

A secondary air supply passage 31, which is communicated with a cleaning chamber in the air cleaner 8, is communicated with an inlet port 29 of the lead valve L, which port 29 is opened into the valve chamber 18 therein.

The vacuum occurring due to a pulsating pressure of an exhaust gas in the exhaust port 6 during an operation of the engine E causes the lead 24 to be opened intermittently, so that the secondary air from the air cleaner 8 can be introduced into the exhaust port 6 through the secondary air supply passage 31, lead valve L and secondary air passage 27.

The secondary air supply passage 31 is provided at its intermediate portion with a secondary air control valve unit V adapted to control a flow rate of the secondary air supplied to the exhaust port 6. The control valve unit V consists of a first control valve $V_1$, which is adapted to be closed during the deceleration of the engine E, and thereby substantially stop supplying the secondary air to the exhaust system, and a second control valve $V_2$, which is adapted to be closed when a choke valve Vc provided in the suction system In is operated with the engine E rotated at a low speed, and thereby reduce a rate of supplying the secondary air to the exhaust system Ex.

A single valve box 32, in which the first and second control valves $V_1$, $V_2$ are installed, is supported via a rubber mount 51 and a pin 52 on a bracket 50 fixed to the main frame F. Inlet and outlet ports 33, 34 for the secondary air are opened into the valve box 32. An upstream passage member 31u, which is communicated with the air cleaner 8, of the secondary air supply passage 31, is communicated with the inlet port 33, and a downstream passage manner 31d, which is communicated with the lead valve L, of the same passage 31, with the outlet port 34. A valve passage 35 is formed in the valve box 32, in which passage 35 first and second valve ports 36, 37 are formed. The inlet and outlet ports 33, 34 are communicated with each other through these valve ports 36, 37.

The first valve port 36 is opened and closed by and with the first control valve $V_1$, and the second valve port 37 by and with the second control valve $V_2$.

The construction of the first control valve $V_1$ will now be described. A first valve body 38 for opening and closing the first valve port 36 is housed in the valve passage 35, and a valve rod 40 connected to the valve body 38 is supported through a guide sleeve 42, which is provided in a wall 41 in the valve box 32, in such a manner that the valve rod can be moved slightly in a reciprocating manner through the guide sleeve 42. A comparatively strong valve spring 43 is provided between the wall 41 in the valve passage 35 and valve body 38, and the resilient force of the valve spring 43 causes the first valve body 38 to be urged so as to be opened.

The first valve body 38 is provided with a leakage bore 44, so that, even when the first valve body 38 is closed, a small amount of secondary air can be supplied to the exhaust system Ex through the leakage bore 44 and secondary air supply passage 31.

A first vacuum-operated system $A_1$ is provided in the portion of the valve passage 35 which is in front of the wall 41. The system $A_1$ has a diaphragm 46, and an atmospheric pressure chamber a and a vacuum chamber b, which are separated from each other by the diaphragm 46. The valve rod 40 extends at its one end into the first vacuum-operated system $A_1$ to be joined to the diaphragm 46. The atmospheric pressure chamber a is communicated constantly with the upstream passage member 31u via an atmospheric passage 47 and valve passage 35. The vacuum chamber b is communicated via a vacuum circuit $CV_1$ with the portion of the suction passage 5 which is in the vicinity of a throttle valve Vth in the carburetor 7, so as to permit the suction vacuum in the suction passage 5 to be applied to the vacuum chamber b.

In the atmospheric pressure chamber a, a boot 48, which consists of a flexible material, such as rubber or a synthetic resin, is joined air-tightly at both ends thereof to end portions of the sleeve 42 and valve rod 40. The atmospheric pressure chamber a and valve passage 35 are air-tightly shut off from each other by the boot 48, so that the air passing through a clearance between the guide sleeve 42 and valve rod 40 does not flow into the atmospheric pressure chamber a.

The construction of the second control valve $V_2$ will be described. A second vacuum-operated system $A_2$ is provided in one side of the valve passage 35 communicated with the secondary air supply passage 31. The system $A_2$ has a diaphragm 53, and an atmospheric pressure chamber a' and a vacuum chamber b', which are separated from each other by the diaphragm 53. The atmospheric pressure chamber a' is constantly communicated with the upstream passage member 31u, and it is also communicated with the valve passage 35 via the second valve port 37. A second valve body 39, which is adapted to open and close the second valve port 37, is fixed to the surface of the diaphragm 53 which faces the atmospheric pressure chamber a'. In the vacuum chamber b', a weak diaphragm spring 54, which is adapted to urge the diaphragm 53 toward the second valve port 37, is provided. When the vacuum force in the vacuum chamber b' increases, the second valve body 39 is removed with the diaphragm 53 from the second valve port 37 against the resilient force of the diaphragm spring 54, so that the second valve port 37 is opened.

The wall of the valve box 32 is provided with a leakage bore 70 therein, which communicates the valve passage 35 and atmospheric pressure chamber a' with each other even when the second valve body 39 is closed, to leak the atmospheric air into the valve passage 35.

A stay 56 is fixed to one side (right side in FIG. 2) of the valve box 32 with setting screws 55, and a first electromagnetic valve $S_1$ is supported on the stay 56. The first electromagnetic valve $S_1$ is provided therein with first and second inlet ports 58, 59 in such a manner that the inlet ports 58, 59 are opposed to each other. A main valve body 61 having an outlet port 60 opened between the first and second inlet ports 58, 59 is provided with a valve chamber 66 therein. A valve body 62 capable of opening and closing the first and second inlet ports 58, 59 alternately, and a valve spring 63 adapted to urge the valve body 62 in the direction, in which the second inlet port 59 is closed therewith are housed in the valve chamber 66. In addition, a solenoid 64 is provided so as to surround the main valve body 61. The solenoid 64 is adapted to urge the valve body 62 against the resilient force of the valve spring 63 in the direction, in which the second inlet port 59 is opened. The first inlet port 58 is communicated with a main vacuum circuit $CV_1$, which is communicated with a vacuum extraction port 65 opened into the suction passage 5. The second inlet port 59 is communicated with an atmospheric air passage 67, which is communicated at the other end thereof with the atmospheric pressure chamber a' via an atmospheric air extraction port 68 provided in the wall of the valve box 32.

The outlet port 60 is communicated with the vacuum chamber b' in the second control valve $V_2$ via a passage 69 formed in the valve box 32.

A switch 72 opened and closed in accordance with a vehicle speed detected of a motorcycle, and a switch 73 opened and closed in accordance with an operation detected of the choke valve Vc in the suction system In are connected in series and inserted in an intermediate portion of a power source circuit 71, which is connected to the solenoid 64. The switch 72 is adapted to be closed when a vehicle speed has reached a level not higher than a predetermined level (for example, 20 K/H). The switch 73 is adapted to be closed when the choke valve Vc has been closed.

A throttle opener Os is provided at a suitable portion of the carburetor 7 in the suction system In. The throttle opener Os has a known construction, and is adapted to be operated when it receives the vacuum force. A vacuum extraction port 84 of the throttle opener Os is communicated with a branched vacuum circuit CV sent out from the main vacuum circuit $CV_1$. An operating rod 74 for the throttle opener Os is operatively connected to the throttle valve Vth via an arm 75. The throttle opener Os is operated in a known manner to slightly open the throttle valve Vth while the engine E is decelerated, to supply air into the suction system In at such an increased flow rate that is necessary to carry out the combustion of a gaseous mixture sufficiently. Thus, noxious unburnt components of an exhaust gas, such as CO and HC can be reduced effectively but the force of the engine brake decreases a little. In order to settle this problem, it is necessary that, when a vehicle speed has decreased to a level not higher than a predetermined level, an operation of the throttle opener Os be rendered ineffective.

If the operational characteristics of the throttle opener Os and the characteristics of a flow rate of the exhaust gas-cleaning secondary air being supplied are suitably selected, a vehicle speed, at which an operation of the throttle opener Os is rendered ineffective, and a vehicle speed, at which the supplying of the secondary air is cut off, or at which a flow rate of the secondary air is reduced, can be equalized. According to the present invention, the vehicle speed-detecting switch 73 can be used also as a switch for rendering an operation of the throttle opener Os ineffective.

A second change-over switch, i.e. a second electromagnetic valve $S_2$ is provided at an intermediate portion of the branched vacuum circuit $CV_2$. The second electromagnetic valve $S_2$ is formed so as to have the same construction as the first electromagnetic valve $S_1$. Namely, a main valve body 76 is provided therein with a valve chamber 77, and first and second inlet ports 78, 79, which are communicated with the valve chamber 77, and which are formed in an opposed relationship, an outlet port 80 being provided between the inlet ports 78, 79. A valve body 81 capable of opening and closing the first and second inlet ports 78, 79 alternately, and a valve spring 82 adapted to urge the valve body 81 in the direction, in which the second inlet port 79 is closed therewith are housed in the valve chamber 77. In addition, a solenoid 83 is provided, which surrounds the main valve body 76, and which is adapted to urge the valve body 81 against the resilient force of the valve spring 82 in the direction, in which the second inlet port 79 is opened thereby. The first inlet port 78 is communicated with the vacuum extraction port 65 of the carburetor 7 via the branched vacuum circuit $CV_2$ and main vacuum circuit $CV_1$. The second inlet port 79 is communicated with the air cleaning chamber in the air cleaner 8 via a pipe 84. The outlet port 80 is communicated with the vacuum extraction port 84 of the throttle opener Os via the branched vacuum circuit $CV_2$. An electric circuit 85 connected to the solenoid 83 is also connected to the portion of the power source vircuit 71 which is between the switches 72, 73. When the switch 73 is closed, the solenoid 83 is excited to close the first inlet port 78 and open the second inlet port 79 with and by the valve body 81.

The operation of the embodiment of the present invention will be described.

(I) During the deceleration of an internal combustion engine:

While the engine is decelerated, the degree of opening of the throttle valve Vth in the carburetor 7 is small, and the high suction vacuum (not less than 450 mmHg) in the suction passage 5 is supplied to the vacuum chamber b in the first control valve $V_1$ through the main vacuum circuit $CV_1$. As a result, the diaphragm 46 is sucked and displaced to left in FIG. 2, and the first valve body 38 is moved to the position shown in chain line in FIG. 2, to close the first valve port 36. In such a case, an irreducible minimum amount of secondary air is supplied to the exhaust port 6 through the leakage bore 44 in the first valve body 38 and downstream passage member 31d. The amount of secondary air supplied through the leakage bore 44 in such a case is so small as to merely promote the combustion of unburnt components; the secondary air is not substantially supplied to the exhaust port 6. Consequently, the occurrence of an afterburning phenomenon can be prevented. When the atmosphere of the threeway conversion catalyst 11 has come close to a theoretical air-fuel ratio, the catalyst 11 works to carry out the reduction and oxidation to eliminate HC, CO and NOx from the exhaust gas.

(II) During a normal operation of an internal combustion engine;

When the engine E has entered into a normal operational region, which is other than the deceleration region, acceleration region and a high-speed operational region, the degree of opening of the throttle valve Vth increases, and the suction vacuum gradually decreases. As a result, the vacuum force in the vacuum chamber b also decreases, and the first valve body 38 is opened by the resilient force of the strong valve spring 43 as shown in full line in FIG. 2, to maintain the first valve port 36 in an opened state. Since the switch 73, which is adapted to be closed when the choke valve Vc is closed, is opened, the second inlet port 59 is closed with the valve body 62 in the first electromagnetic valve $S_1$ whether the switch 72 for detecting a vehicle speed is opened or not. The suction vacuum is applied to the vacuum chamber b' in the second control valve $V_2$ through the main vacuum circuit $CV_1$, first inlet port 58, and outlet port 60 to cause the second valve body 39 to be opened (the second valve body 39 is adapted to be opened at vacuum of not less than 95 mmHg) against the weak diaphragm spring 54 as shown in full line in FIG. 2, so that the second valve port 37 is also kept open.

Therefore, in a normal operational region of the engine E, both the valve ports 36, 37 of the first and second control valves $V_1$, $V_2$ are opened. Accordingly, the secondary air supply passage is put in a communicated state, so that the lead valve L is communicated with the atmosphere via the air cleaner 8 (FIG. 1).

On the other hand, the pulsating pressure of exhaust gas, which occurs during an operation of the internal combustion engine reaches the lead valve L through the secondary air passage 27 to cause the valve L to be opened. Consequently, the clean air from the air cleaner 8 is introduced into the lead valve L through the secondary air supply passage 31 and secondary air control valve V, which is in an opened state as mentioned previously. The resulting air is introduced into the exhaust port 6 through the secondary air passage 27.

The secondary air introduced into the exhaust port 6 is mixed in an exhaust gas to oxidize a part of HC and CO, which are mixed in the exhaust gas, in the exhaust port 6 and exhaust pipe 9. The secondary air-mixed exhaust gas further flows to the three-way conversion catalyst 11 through the muffler 10 to form an oxidizing atmosphere with the catalyst 11. Thus, the catalyst 11 can serve as an oxidizing catalyst, by which mainly CO and HC in the exhaust gas are oxidized to be converted into $CO_2$ and $H_2O$.

(III) During the acceleration and a high-speed operation of the internal combustion engine:

When the degree of opening of the throttle valve Vth for the engine E is increased to put the engine in an acceleration region or a high-speed operational region, the suction vacuum in the suction passage 5 decreases, and the vacuum force applied to the vacuum chamber b' in the second control valve $V_2$ via the first electromagnetic valve $S_1$ also decreases to a low level (not higher than 95 mmHg). Consequently, the diaphragm 53 is displaced to left in FIG. 2 due to the resilient force of the weak diaphragm spring 54, so that the second valve body 39 is moved to a position shown in chain line in FIG. 2, to close the second valve port 37 therewith.

When the second valve port 37 of the second control valve $V_2$ has thus been closed with the second valve body 39, no sufficient amount of secondary air is supplied to the exhaust system Ex but an irreducible minimum amount of secondary air is supplied thereto only from the leakage bore 70, the secondary air from the leakage bore 70 flowing to the exhaust port 6 through the first valve port 36 and downstream passage member 31d.

Therefore, when the secondary air is not substantially supplied to the exhaust system Ex in an acceleration region or a high-speed operational region of the engine E, the reducing atmosphere can be formed with the three-way conversion catalyst 11, and NOx, which is generated at a high rate mainly in the mentioned operational regions, can be reduced to innoxious $N_2$ and $O_2$ and eliminated.

(IV) During a starting operation of an internal combustion engine:

During a starting operation of the engine E, in which the choke valve Vc is actuated, the switch 73 is closed in accordance with an operation of the choke Vc. When a vehicle speed is not higher than a predetermined level (20 K/H), the switch 72 for the vehicle speed sensor is also closed. As a result, the power source circuit 71 is closed to cause the first and second electromagnetic valves $S_1$, $S_2$ to be excited. Consequently, the valve bodies 62, 81 in the valves $S_1$, $S_2$ are excited. Owing to the excitation of the first electromagnetic valve $S_1$, the valve body 62 is drawn downward in FIG. 2, so that the first inlet port 58 is closed. At the same time, the second inlet port 59 is opened, and the atmospheric air in the atmospheric pressure chamber a' flows into the vacuum chamber b' through the atmospheric air extraction port 68, atmospheric air passage 67, and first electromagnetic valve $S_1$. The diaphragm spring 54 with the diaphragm 53 causes the second valve body 39 to be displaced to left in FIG. 2, so that the second valve port 37 is closed. Also, owing to the excitation of the second electromagnetic valve $S_2$, the valve body 81 is drawn downward in FIG. 2, so that the first inlet port 78 is closed. At the same time, the second inlet port 79 is opened, and the atmospheric air from the air cleaner 8 flows into the throttle opener Os from the vacuum extraction port 84 through the second inlet port 79, valve chamber 77 and outlet port 80 to render the operation of the throttle opener Os ineffective.

As described above, when the internal combustion engine E is started to cause the choke valve Vc to be operated with the vehicle speed of the motorcycle still not higher than a predetermined level, the exhaust gas-cleaning secondary air is not substantially supplied to the exhaust system Ex to reduce the reaction between the unburnt components in the exhaust system Ex and secondary air. Thus, an increase in the temperature of the exhaust pipe 9 and muffler M in the exhaust system Ex can be prevented. Therefore, when a vehicle speed is so low that the wind occurring as the vehicle runs does not serve to sufficiently cool the exhaust pipe 9 and muffler M, the change in the color and the discoloring thereof can be minimized by suppressing the reaction referred to above. Since the operation of the throttle opener Os is rendered ineffective at the same time, a rate of sucking air into the suction passage 5 is also reduced, so that the reaction of unburnt components in the exhaust system Ex can be further reduced.

When a vehicle speed has become not lower than predetermined level (20 K/H), the switch 72 is opened, and the solenoid 64 for the first electromagnetic valve 57 is deenergized. As a result, the valve body 62 is urged by the valve spring 63 to close the second inlet port 59, and the second valve body 39 is opened in accordance with the suction vacuum applied to the vacuum chamber b'. At this time, highly-concentrated unburnt components, HC and CO, discharged to the exhaust system Ex and the secondary air supplied to the exhaust port 6 react actively to increase the temperature of the exhaust system Ex to a high level. However, the exhaust system Ex is cooled sufficiently with the wind occurring as the vehicle runs. Accordingly, the color of the exhaust pipe 9 and muffler M in the exhaust system Ex is neither changed nor lost.

In the above-described embodiment, the secondary air supply passage 31 may be so designed that, when the secondary air control valve unit V consisting of the first and second control valves $V_1$, $V_2$ is closed, the passage 31 is shut off completely from the flow of the secondary air.

According to the present invention described above, when a motorcycle employing an internal combustion engine E, in which the exhaust gas-cleaning secondary air supply passage 31 is connected to the exhaust system Ex with the throttle opener Os for promoting the combustion of a gaseous mixture in a low-speed operational region of the engine E provided in the suction system In, runs, after the engine E has been started, with the vehicle speed still not higher than a predetermined level, the secondary air control valve unit V provided in the secondary air supply passage 31 is closed to reduce the rate of supplying the secondary air, or stop supplying the same, to the exhaust system Ex, and the operation of the throttle opener Os is rendered ineffective. Therefore, when the motorcycle runs at so low a speed that the exhaust pipe 9 and muffler M are not substantially cooled with the wind occurring as the motorcycle runs, the reaction between the secondary air and unburnt exhaust gas in the exhaust system Ex can be suppressed. Accordingly, the exhaust pipe 9 and muffler M are not heated, so that a change in the color, and the discoloring, of the outer surfaces of the exhaust pipe 9 and muffler M can be prevented. Moreover, in spite of the throttle opener Os provided on the carburetor, the required effect of engine brake does not decrease. Especially, the step of closing the secondary air control valve V and rendering an operation of the throttle opener Os ineffective can be carried out by the switch 73, which is used also as a switch for detecting a vehicle speed not higher than a predetermined level. Therefore, the two operations mentioned above can always be carried out simultaneously and reliably. In addition, the control devices for carrying out these operations can be made of a smaller number of parts. This allows the structure of a smaller number of parts. This allows the structure according to the present invention to be formed simply, and contributes much to a decrease in the cost of manufacturing the same.

The present invention is not, of course, limited to the above embodiment; it may be modified in various ways within the scope of the appended claims.

What is claimed is:

1. A structure for controlling operations of a secondary air supplying means and a throttle opener in an internal combustion engine for motorcycles in which an internal combustion engine is mounted on a main frame and includes suction and exhaust systems, an exhaust gas cleaning means for supplying secondary air to said exhaust system so as to clean an exhaust gas flowing therethrough, a carburetor provided in said suction system and including a throttle valve, and a throttle opener provided on said carburetor and adapted to open said throttle valve slightly while said internal combustion engine is rotated at a low speed, said structure comprising a secondary air supply passage communicated with said exhaust system, a control valve adapted to control a flow rate of the secondary air flowing through said secondary air supply passage, a first electromagnetic valve for opening and closing said secondary air control valve, a second electromagnetic valve for controlling an operation of said throttle opener, a power source circuit for connecting said first and second electromagnetic valves to a power source, and a switch used in common with said secondary air supply means and said throttle opener, provided in said power source circuit, and adapted to detect such a vehicle speed of said motorcycle that is not higher than a predetermined level and thereby shift the operations of said first and second electromagnetic valves, whereby said secondary air control valve is closed with the operation of said throttle opener rendered ineffective at the same time.

* * * * *